D. P. COLLINS.
SPEED CHANGING AND TRANSMISSION GEARING.
APPLICATION FILED JUNE 25, 1909.

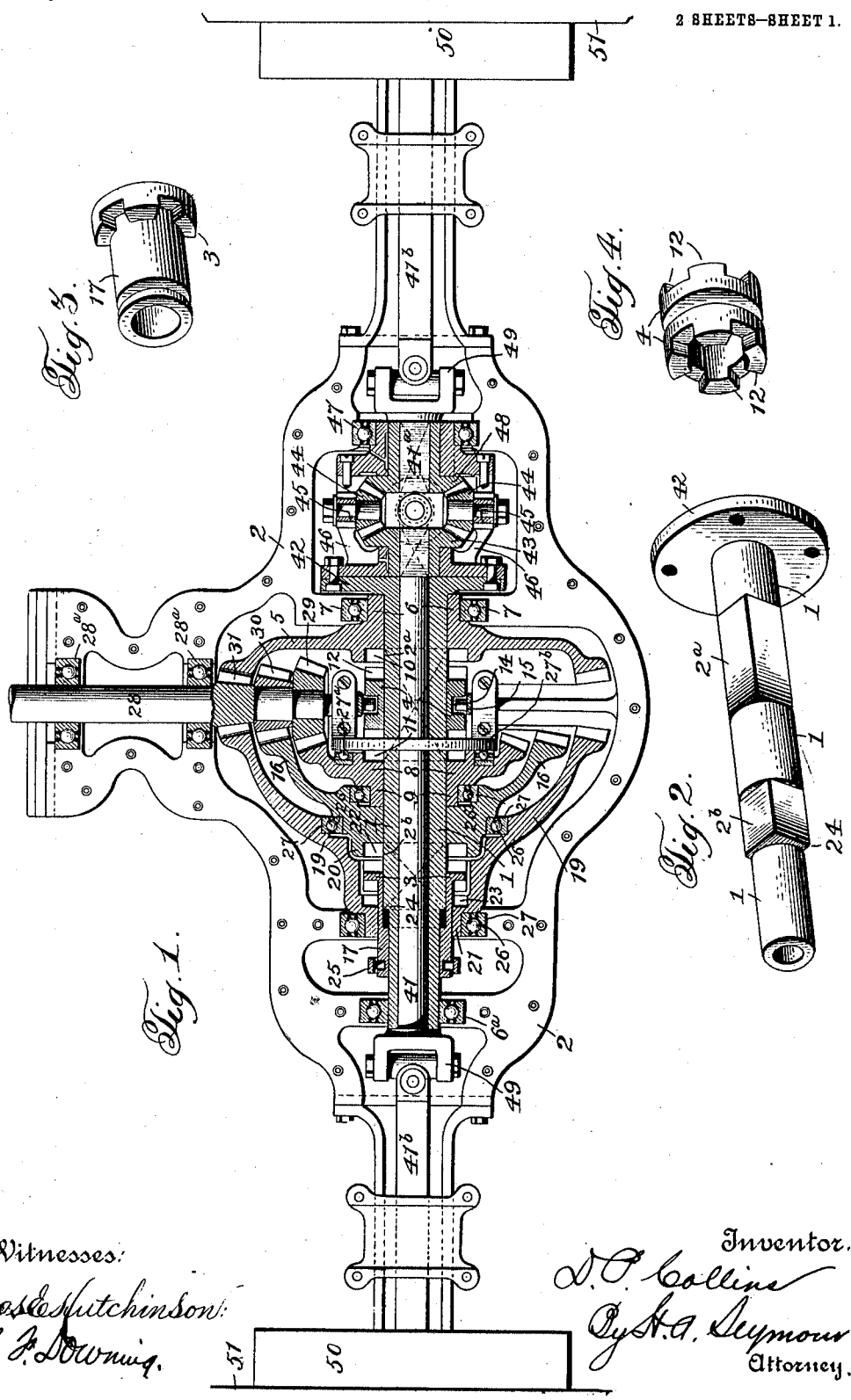

978,700.

Patented Dec. 13, 1910.
2 SHEETS—SHEET 2.

Witnesses:
Jas E Hutchinson
H. F. Downing

Inventor:
D. P. Collins
By H. A. Seymour Attorney.

UNITED STATES PATENT OFFICE.

DENNIS P. COLLINS, OF PITTSBURG, PENNSYLVANIA, ASSIGNOR TO COLLINS AXLE AND MANUFACTURING COMPANY, OF PITTSBURG, PENNSYLVANIA.

SPEED-CHANGING AND TRANSMISSION GEARING.

978,700.  Specification of Letters Patent.  Patented Dec. 13, 1910.

Application filed June 25, 1909. Serial No. 504,336.

*To all whom it may concern:*

Be it known that I, DENNIS P. COLLINS, of Pittsburg, in the county of Allegheny and State of Pennsylvania, have invented certain new and useful Improvements in Speed-Changing and Transmission Gearing; and I do hereby declare the following to be a full, clear, and exact description of the invention, such as will enable others skilled in the art to which it appertains to make and use the same.

My invention relates to an improvement in speed changing and transmission gearing, designed particularly for use on automobiles, the object being to materially decrease the cost by reducing the number of parts, and to increase the efficiency by reducing friction.

A further object is to provide a selective type transmission gearing in which all the gears are always in mesh whether idle or working, and in which the operation of the gears is controlled by clutches connected up to an operating lever.

With these and other ends in view my invention consists in the parts and combinations of parts as will be more fully described and pointed out in the claims.

Figure 5:
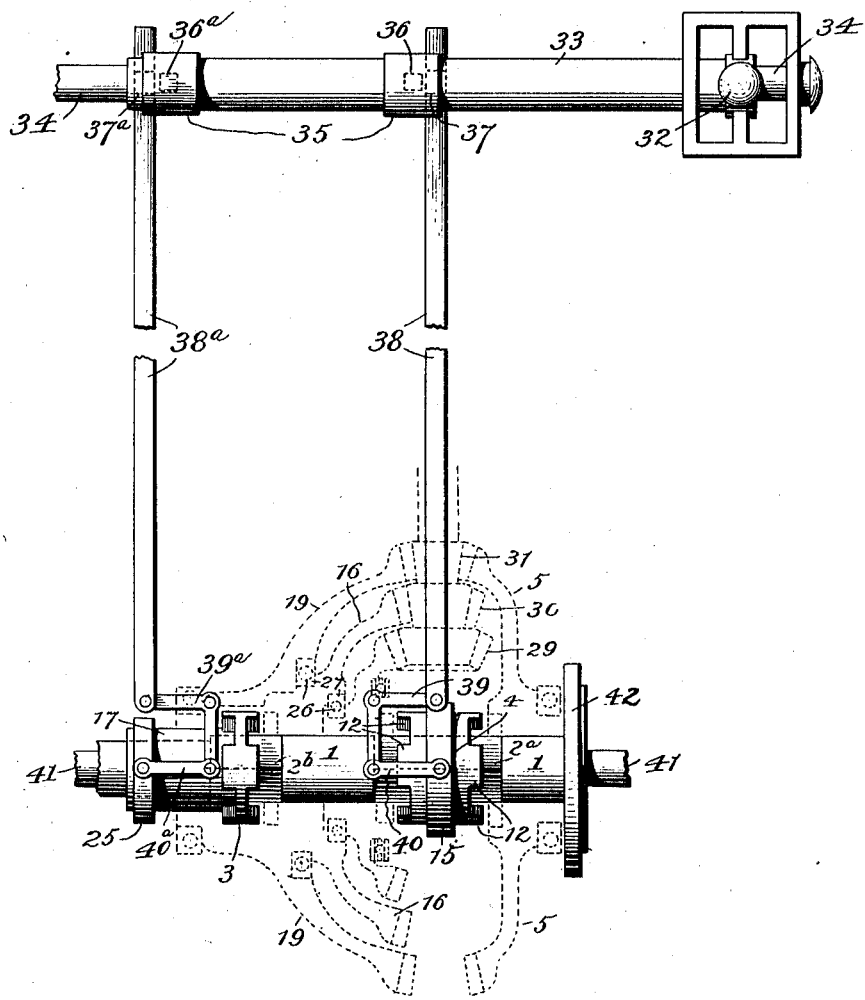
Figure 6:
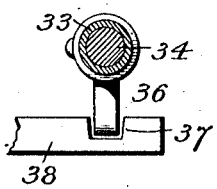

In the accompanying drawings, Figure 1 is a view of the gearing in section and the rear axle in elevation; Fig. 2 is a view in perspective of a section of the sleeve, Figs. 3 and 4 are views in perspective of the clutches, and Figs. 5 and 6 are views of the lever mechanism for actuating the clutch.

1 represents the rear axle sleeve which carries the driven gears of the series. This sleeve is mounted in the cast steel frame 2 which latter is closed under the gears and forms not only the bearing for the sleeve and rear axle, but also the lower member of the housing, the upper part of the housing (not shown) being preferably made of aluminum or other light metal. The portions 2ª—2ᵇ of the sleeve 1 embraced by the sliding clutches 3 and 4, are angular in cross section, while the remaining parts are cylindrical and form bearings for the several driven gears.

Loosely mounted on the cylindrical portion of sleeve 1, is the reverse gear 5, the hub 6 of which is mounted and supported in the roller bearing 7, and loosely mounted on the cylindrical section of the axle 1, is the third or fast speed gear 8.

The inner or adjacent faces of the hubs 6 and 9 of the gears 5 and 8 are provided with clutch teeth 10 and 11, with which the teeth or members 12 of the sliding clutch 4 mesh. This clutch 4 has an angular bore conforming in shape and size to the angular portion of the sleeve, and is adapted to slide thereon so as to engage either clutch teeth 10 or 11, or be moved to a neutral position between the two gears. In the drawing, the clutch 4 is shown in its neutral position, and the construction is such that it cannot engage the clutch teeth of both driven gears 5 and 8 at the same time, and when in such neutral position both gears 5 and 8 run loosely on the sleeve when the drive shaft is rotating. The clutch 4 is provided with a peripheral groove 14 in which the yoke 15 of its actuating lever rests. When this yoke is shifted by the actuating lever, clutch 4 will be shifted laterally, thus locking one of the wheels 5—8 to the sleeve 1.

Loosely mounted on the cylindrical portion of sleeve 1, is the second speed driven gear 16, and loosely embracing the cylindrical hub 17 of the gear clutch 3 is the hub of the first or slow speed gear 19. The hubs 20 and 21 of the speed gears 16 and 19, are provided at their adjacent ends with clutch teeth 22 and 23, which latter are engaged by the teeth of clutch 3. This clutch, as before explained, is integral with or fixed to the cylindrical hub 17, which latter is mounted on the sleeve 1, and forms the bearing for the slow speed gear 19. The bore of the hub 17 from the outer side of clutch 3 to the point 24, is square and conforms to the squared section of sleeve 1, while the remaining portion of said bore is cylindrical and conforms in shape and size to the cylindrical portion of the sleeve. The outer end of the hub 17 is provided with a groove engaged by the yoke 25, having means for its connection to the operating lever.

Clutch 3 is constructed so that it may rest in a neutral position between annular clutch members 22 and 23 without engaging either, and when so placed, as in Fig. 1, both gears 16 and 19 run loosely on their respective bearings. By shifting the clutch 3 toward the second speed gear 16, the latter will be locked to the sleeve through the medium of the clutch, and by moving the clutch toward the slow speed gear 19, gear 16 will be disconnected from the axle, and by continuing the movement to the left, the slow speed gear 19 will be clutched up to the axle.

The clutch hub 17 and the clutch wheel 12 are to be actuated by a single lever, with connections so arranged that only one clutch can be actuated at a time, hence it will be impossible to clutch up one driven gear to the sleeve while another is locked thereto.

The reverse gear 5 and the slow speed gear 19 are of the same size; the second speed gear 16 is of less diameter than gear 19, and the first or fast speed gear 8 is smaller than gear 16. These gears are all nested closely on the axle, and anti-friction balls 26 are arranged in raceways 27 formed in the adjacent faces of the several gears and between gear 19 and its bearing in frame 2. By this means the inner gears are supported by the outer gears and the last or outer gear of the set is similarly supported by balls carried by a raceway in the gear casing. The fast speed gear 8 is also supported on its inner face by the antifriction balls $27^a$ which are carried by the circular abutment $27^b$ carried by the casing 2.

28 is the driving shaft mounted at its rear end in anti-friction bearings $28^a$ carried by frame 1 having three fixed bevel pinions 29, 30 and 31. The pinion 31 meshes with the reverse gear 5 and with the third or slow speed gear 19, the pinion 30 with the second speed gear 16 and the pinion 29 with the first or fast speed gear 8. It will therefore be seen that each speed gear and the reverse gear, is directly driven, and all rotate when the driving shaft 28 is rotating.

The lever mechanism for actuating the clutches, is shown in Figs. 5 and 6 and consists of a single controlling lever 32 secured to a sleeve 33 mounted to slide on the shaft 34 fixed to the frame of car. This lever passes through the selective quadrant fastened to the frame of the car, and adapted to regulate the length of the throw of lever 32. By moving lever 32 to the right or left, it will move the sleeve endwise and pass from its neutral position as shown, into one of the longer slots, and is then in a position where it can be moved forwardly or rearwardly to throw in or disconnect one of the clutches. The sleeve 33 carries two fixed collars 35, one of which carries a finger 36 and the other a finger $36^a$ resting in the plane of the slots 37 and $37^a$ in pitmen 38 and $38^a$. These pitmen are so supported that they remain in the position in which they are left by the fingers 36 and $36^a$ so that when the latter are moved laterally by the lever 32, they will move into their respective slots 37—$37^a$ in pitmen 38—$38^a$.

As shown in Figs. 5 and 6 the fingers 36 and $36^a$ are in a neutral position, and in the position they occupy when lever 32 is in its neutral position. By now moving lever 32 to one side, say to the right it will shift sleeve 33 to the right and carry finger 36 into slot 37 in pitman 38. By now throwing the lever 32 either forward or backward it will move the finger 36 backward or forward, and as the latter is now in engagement with the pitman 38 it will move it in a corresponding direction. The movement of the pitman will be transmitted through bell crank lever 39 and link 40 to the yoke 15 which actuates clutch 4. By shifting lever 32 to the left, finger 36 will be disengaged from pitman 38, and by a further movement to the left finger $36^a$ will engage pitman $38^a$ and through pitman $38^a$, bell crank $39^a$ and link $40^a$, shift the yoke 25 of clutch 3. By this arrangement it is impossible to actuate either clutch until the operating mechanism of the other clutch has been disconnected from the actuating lever 32.

Sleeve 1 is hollow for the passage of the left rear wheel axle 41, which latter passes through the sleeve 1, and said sleeve is provided at its right hand end with an integral flange 42. The sleeve is firmly supported at its ends in the antifriction bearings $6^a$ and 7 carried by the frame 1, and the axle 41 is supported throughout its length by the sleeve 1 and projects at its end adjacent to flange 42, beyond the said flange for the attachment of the bevel pinion 43, which meshes with the pinions 44 mounted on bearings 45 carried by the frame 46 rigidly bolted to the flange 42, and mounted at its outer end in the bearing 47 carried by the frame or casing 1. The two gears 44 mesh with the bevel gear 48 rigidly secured to the right hand end $41^a$ of the rear axle.

From the foregoing it will be seen that motion is transmitted from the sleeve 1 to the sectional rear axle $41^a$ and $41^b$ through the differential gearing 43, 44 and 48, which latter operates in the usual and well known manner. The outer sections $41^b$ of the axle are connected to the sections 41 and $41^a$ respectively by the flexible or universal couplings 49 which latter permit of the necessary freedom of movement of the several parts, without binding or unduly straining any of the parts of the axle, or the gearing coupled up to the same. These portions $41^b$ of the axle are also supported in bearings in the casing or frame 2, and carry the friction drums 50 and the drive wheels 51.

By locating the change speed gears directly on the sleeve 1, and by directly connecting the driving gears thereto, I simplify the construction, reduce the number of parts, considerably decrease the weight, and cheapen the cost of manufacture.

It is evident that many slight changes might be resorted to in the relative arrangement of parts shown and described without departing from the spirit and scope of my invention; hence I would have it understood that I do not wish to confine myself to the exact construction and arrangement of parts shown and described, but, Having fully described my invention what I claim as new and desire to secure by Letters-Patent, is:—

1. The combination with a sleeve and variable speed and reverse gears loosely mounted thereon, of a driving shaft, a fixed gear thereon meshing directly with the slow speed and reverse gears on the sleeve, and a fixed gear for each of the other speed gears, a clutch for locking either the fast speed or reverse gear to the sleeve, and a second clutch for locking either of the other speed gears to the sleeve.

2. The combination with a sleeve having cylindrical sections, intermediate angular sections, and a cylindrical section intermediate the angular sections, and variable speed and reverse gears loosely mounted on the cylindrical portions of the sleeve, of a driving shaft, a fixed gear thereon meshing directly with the slow speed and reverse gear wheels, and a fixed gear for each of the other speed gears, a clutch slidingly mounted on an angular section of the sleeve for locking either the fast speed or reverse gear to the sleeve, and a second clutch also mounted on an angular section of the sleeve for locking either of the other speed gears to the sleeve.

3. The combination with an axle driving sleeve and variable speed and reverse gears loosely mounted thereon, of a drive shaft geared directly to each of said speed and reverse gears, and clutches slidingly mounted on the sleeve, one for locking the fast speed or reverse gear to the sleeve, and the other for locking either of the other speed gears to the sleeve.

4. The combination with an axle driving sleeve, variable speed and reverse gears loosely mounted thereon, and anti-friction supporting means for the speed gears intermediate the latter, of a drive shaft, a fixed gear thereon meshing directly with the fast and reverse speed gears, and a fixed gear for each of the other speed gears, and clutches for locking the speed and reverse gears to the sleeve.

5. The combination with variable speed and reverse gears, a driven member on which said gears are mounted, two clutches for locking said gears to said driven member, and a rod for actuating each clutch, of a longitudinally sliding and rotary sleeve having an engaging member for each clutch actuating rod, and a lever fixed to said sleeve and adapted to be moved laterally for moving one of said engaging members into or out of engagement with its respective clutch actuating rod, and also adapted to be moved forwardly or backwardly, whereby the engaging member in engagement with its clutch actuating rod, will shift the latter and actuate the clutch.

6. The combination with a sleeve, variable speed and reverse gears thereon, and two clutches for locking said gears to the sleeve, of a longitudinally sliding and rotary sleeve, a lever connected thereto and adapted to be moved laterally and forwardly and backwardly, a lever for each clutch, and means connecting the sliding and rotary sleeve with the two clutch levers, whereby either lever may be connected to said sleeve, the parts being so arranged that the sleeve will be disconnected from one clutch lever before it can be connected to the other.

7. The combination with a plurality of transmission gears, a member to be driven thereby, and a plurality of clutches for locking said gears to said member, of a rod for each clutch, a sliding and rocking shaft, an engaging member on said shaft for each rod, the said engaging members being so located with relation to their respective rods, that both rods cannot be coupled to their engaging members at the same time, and means for rocking and moving said shaft endwise.

8. The combination with transmission gears and a plurality of clutches, of a rod for each clutch, each rod having a slot near its outer end, a sliding and rocking shaft having a finger for each slot, the said fingers on the shaft being so located with relation to the slots that one finger must leave its slot before the other can enter its slot, and means for sliding and rocking the shaft.

9. The combination of a frame, a sleeve mounted in anti-friction bearings on said frame, driven gears loose on said sleeves, and anti-friction bearings intermediate the said driven gears and between the frame and the outer gears of the series.

In testimony whereof, I have signed this specification in the presence of two subscribing witnesses.

DENNIS P. COLLINS.

Witnesses:
A. W. BRIGHT,
R. L. FERGUSON.